Jan. 24, 1956 W. C. MASON 2,731,782
DEVICE FOR PICKING UP AND COMPRESSING LOOSE MATERIALS
Filed Sept. 15, 1948 3 Sheets-Sheet 1

Inventor
William C. Mason
by
His Attorney.

Jan. 24, 1956　　　W. C. MASON　　　2,731,782
DEVICE FOR PICKING UP AND COMPRESSING LOOSE MATERIALS
Filed Sept. 15, 1948　　　3 Sheets-Sheet 2
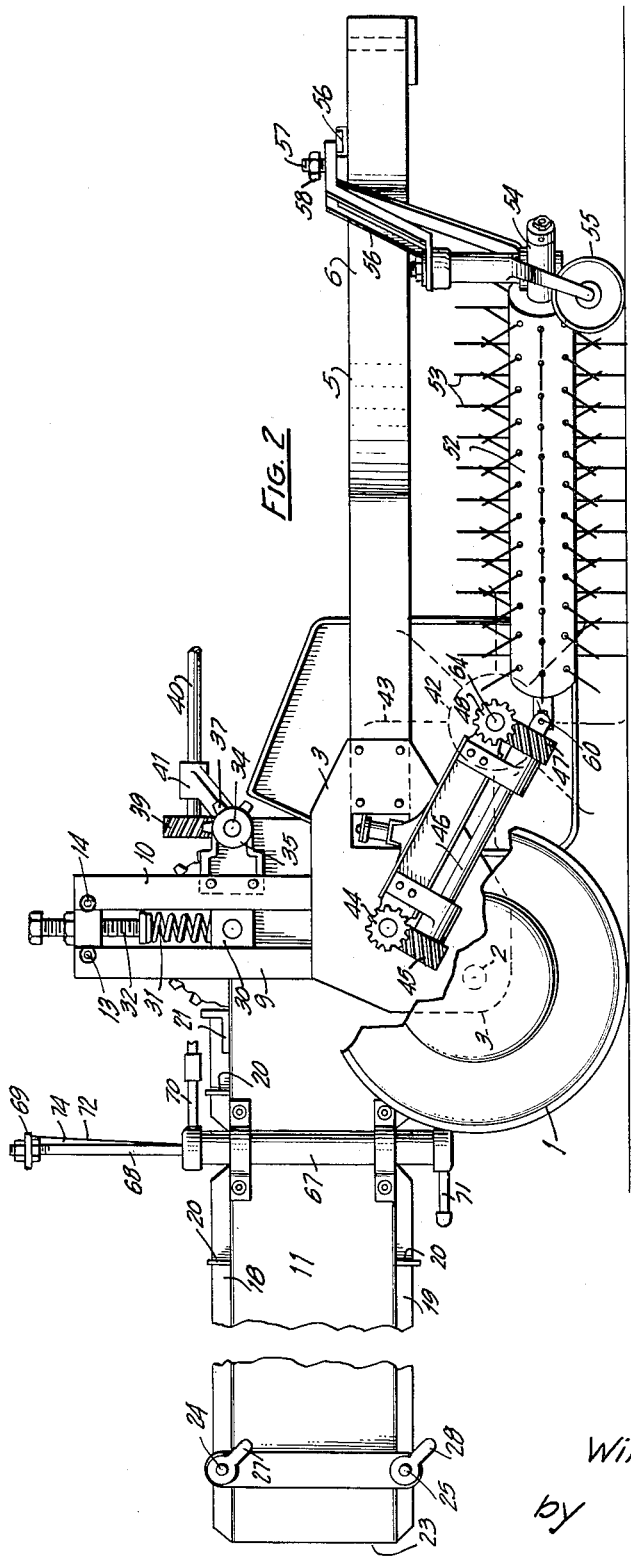
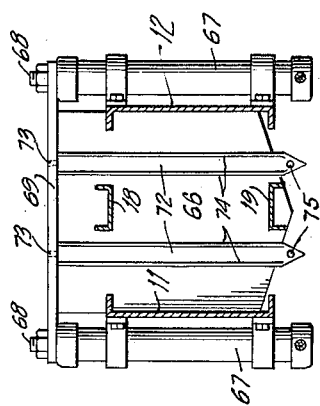
Inventor:
William C. Mason,
by His Attorney.

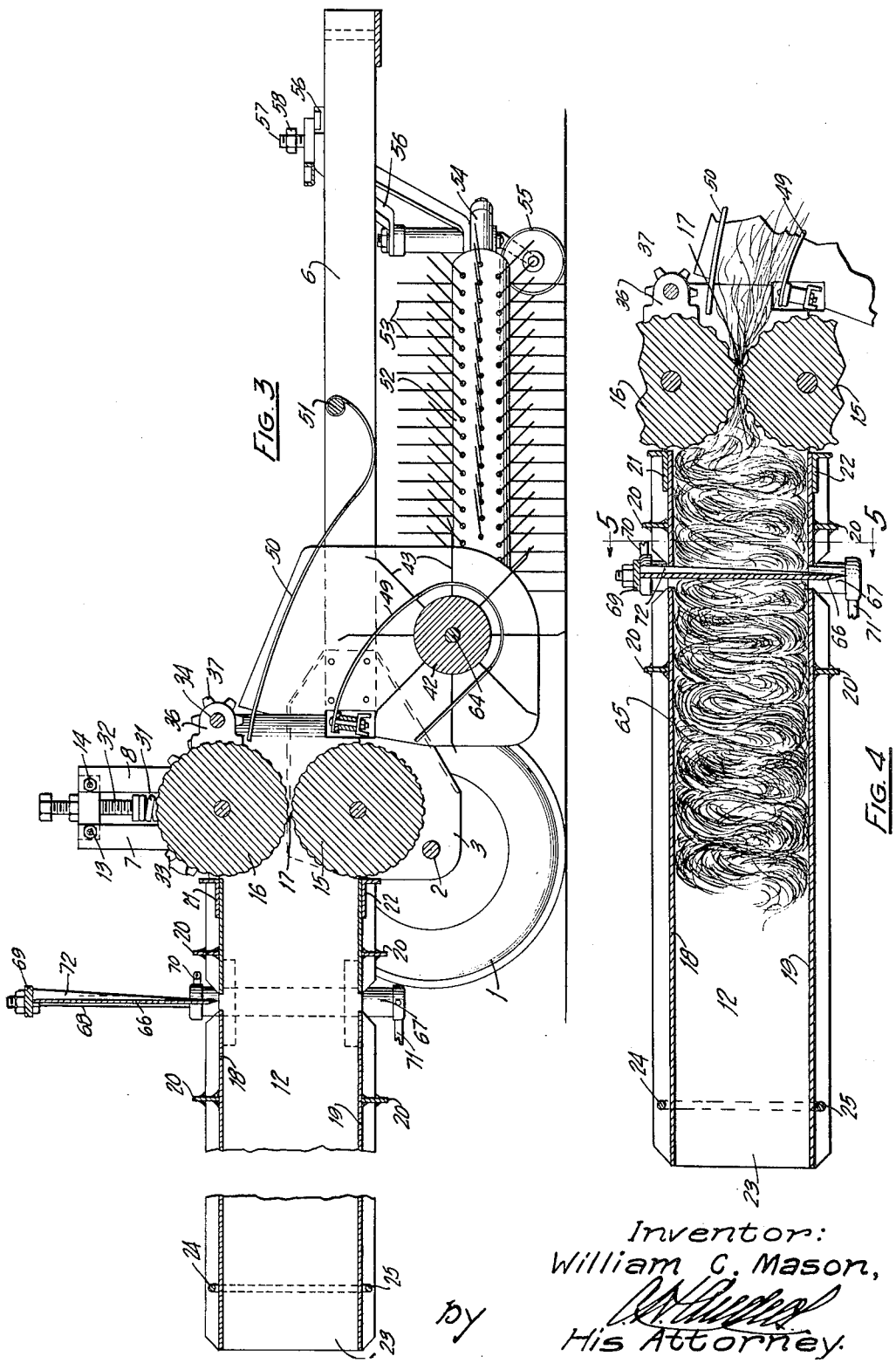

2,731,782

DEVICE FOR PICKING UP AND COMPRESSING LOOSE MATERIALS

William C. Mason, Slingerlands, N. Y.

Application September 15, 1948, Serial No. 49,321

3 Claims. (Cl. 56—341)

My invention relates to devices for compressing loose materials such, for example, as hay, straw and the like, and particularly, but not exclusively, to improvements in hay baling machines of the ambulatory type.

At the present time, the procedure for bailing hay in the field is first, to rake the hay into windrows, usually by means of a side delivery rake, which takes from one-half to two-thirds as long as the mowing operation. After the windrows are formed, the baler follows the windrows, picks up the hay, and forms it into bales.

If, after the hay has been cut, and before it has been raked into windrows, a shower occurs, the hay will soon dry again if left in the flat condition, as mowed. On the other hand, if the hay gets wet after it has been raked into windrows, it will mildew unless spread out and dried; and hence must be re-raked before it can be baled. Moreover, the hay must be partially dried before it can be spread from the windrows and, in the meantime, its color darkens and its quality is otherwise impaired. Thus, the present practice requires at least two different machines and a minimum of two operations, although more time-consuming operations may be required, depending on weather conditions. Furthermore, the present types of balers are comparatively large, heavy, complicated machines involving the use of reciprocating parts, such as plungers, for effecting a compression of the loose hay into bales.

The principal object of my invention is to provide an extremely simple mechanism for compressing loose materials, and which may be used not only in a hay baler of the ambulatory or stationary type, but also for compressing other loose materials, such for example as rags, into a compact mass.

Another object is to provide a hay baler in which a compressing mechanism is combined with means for raking the hay into windrows simultaneously with the compressing operation, thereby not only saving a great deal of time but with the added advantage that the hay is left as mowed until it is baled. Thus, if it becomes wet, it may be merely left, until it is dry, and then raked and baled with a single machine in a single operation.

Another object is to provide a combined raking and compressing device, and one in which the area of the zones from which the hay is raked and fed to the baler may be varied. Thus, where the hay is heavy, it may be raked and fed to the compressor from a zone of comparatively small area; and, if light, it may be raked and fed from a zone of comparatively large area.

Another object is to combine a rake and baler in a single unit, thus substituting one machine for the two now necessarily used; and to provide such a unit which is of extremely simple construction; which has only a few parts; which is much lighter in wheight and lower in cost than the present types of machines; and which may be stored in a much smaller space than the present types of balers.

A further object is to provide a device of the character described which will operate upon the hay with less stripping of the heads and leaves than the present types of balers, and which will thoroughly clean the field of mown hay, thus eliminating the necessity of additional raking.

I accomplish these objects by means of the novel elements and the combinations and arrangements thereof described below and illustrated in the accompanying drawing in which—

Fig. 2 is a side elevation thereof with portions broken away;

Fig. 3 is a longitudinal, vertical section through the center of the machine;

Fig. 4 is a fragmentary, longitudinal, vertical section showing the compression rolls and the compression chamber partially filled with hay; and Fig. 5 is a section of Fig. 4 in the plane 5—5.

Referring to the drawings—

Figure 1:
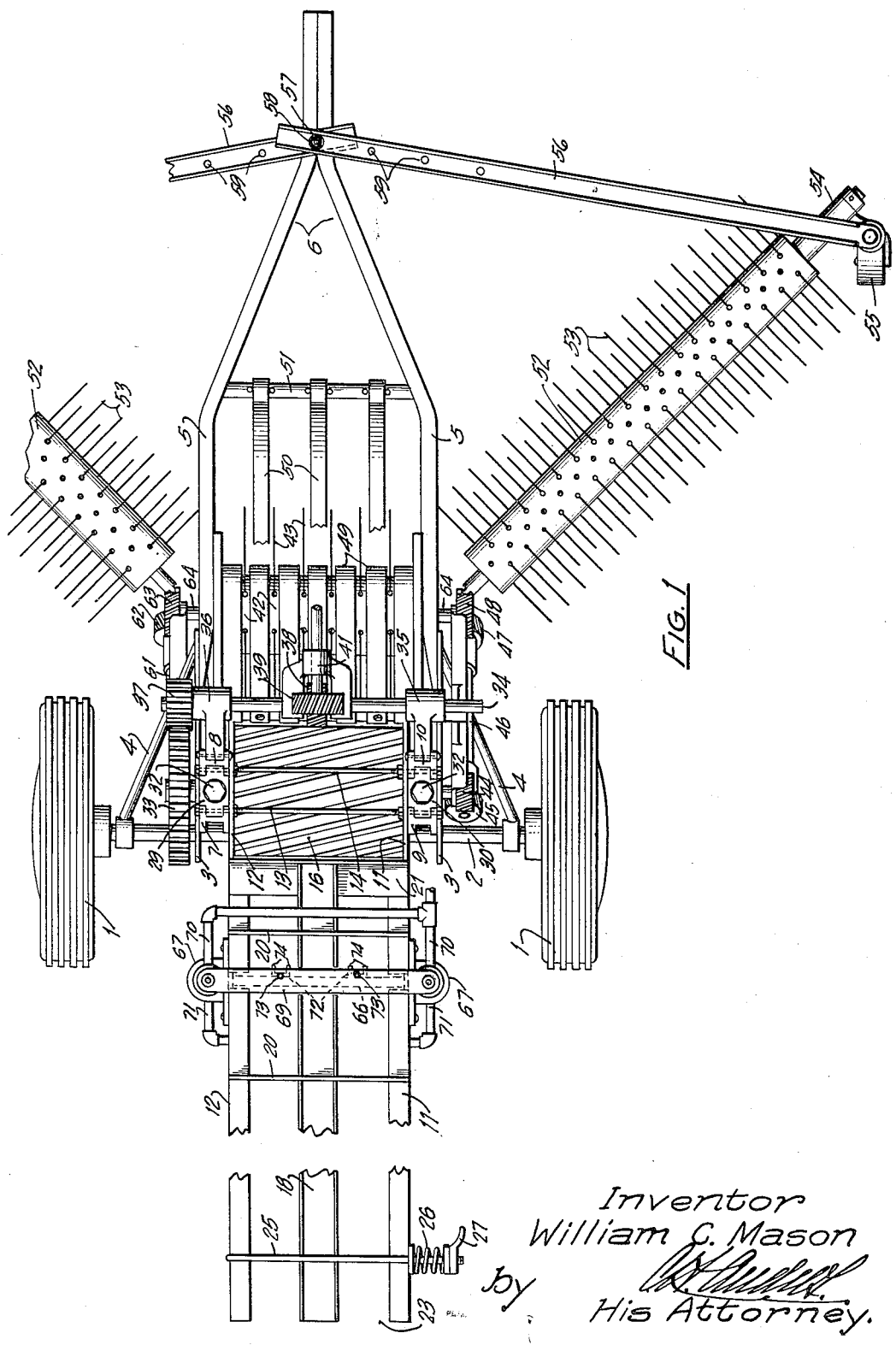
Fig. 1 is a fragmentary, plan view of my device.

My device comprises a pair of ground wheels 1 mounted on an axle 2 on which the device is supported and may be pulled over the ground. The axle 2 passes through side plates 3 which are held by the inclined braces 4 (see Fig. 1) supported on the axle. Secured to each of the plates 3, by rivets, welding or otherwise, is a side 5 of the drawbar 6 which may be provided, at the free end thereof, with means adapting it to be attached to a tractor.

Secured to the inner sides of the plates 3 in any suitable manner, as by bolting, riveting or welding (not shown), are the vertically-extending I-beams 7, 8, 9 and 10; and secured to the inner sides of the I-beams are the vertical webs of channels 11 and 12 which form the sides of the chamber within which the hay is compressed. At the top, the I-beams 7 and 9 and the I-beams 8 and 10 are secured together by the transversely-extending rods 13 and 14, respectively.

Rotatably mounted between the webs of the channels 11 and 12 forming the sides of the compression chamber, are two cooperating rolls 15 and 16 which, as illustrated in Figs. 1, 3 and 4, have spirally corrugated surfaces. However, it is to be understood that corrugations extending parallel to the axes of the rolls may be used, and that rolls having smooth surfaces function fairly satisfactorily.

The top surface of the lower roll is midway between the tops and bottoms of the channels 11 and 12 forming the sides of the compression chamber, and the diameters of the rolls, which are equal to each other, are approximately equal to the depth of the compression chamber so that only the upper half of the lower roll and the lower half of the upper roll are disposed between the webs of the channels 11 and 12. Thus, the pinch 17 of the rolls is disposed midway between the top and bottom of the compression chamber.

The compression chamber is an elongated tubular element which is only partially closed at the top and bottom by the channels 18 and 19, respectively; these channels being supported between and in spaced relation to the side channels 11 and 12 by means of transversely-extending braces 20. It will thus be apparent that the compression chamber extends rearwardly of the machine as a cantilever from the zone where it is secured to the I-beams 7, 8, 9 and 10. Immediately adjacent the rolls, the tubular compression chamber is closed for a short distance at the top and bottom by means of the angles 21 and 22, respectively.

In order adjustably to reduce the cross-sectional area of the compression chamber as it approaches the open, free end 23 thereof, so that resistance to the passage of the compressed hay through the compression chamber will be sufficient to allow it to be compressed to the desired degree, the channels 11 and 12 are yieldingly and adjustably clamped together at the top and bottom by the rods 24 and 25, helical springs 26 (see Fig. 1), and nuts 27 and 28.

The upper roll 16 is supported in bearings 29 and 30 which are slidable up and down between the I-beams 7 and 8 and the I-beams 9 and 10, respectively; and these bearings are yieldingly and adjustably urged downwardly by means of helical springs 31 and threaded studs 32. The bearings for the lower roll (not shown) are identical with the bearings for the upper roll but are fixedly, instead of slidably mounted, in the I-beams 7 and 8, and 9 and 10.

Secured to the shaft of the roll 16 is a gear 33 having comparatively large teeth (partially shown in Fig. 3) which mesh with the teeth on a similar gear on the shaft of roll 15. A driving shaft 34, extending transversely of the machine, is mounted in bearings 35 and 36 which are secured to the I-beams 10 and 8, respectively, as best shown in Figs. 1 and 2. A driving pinion 37 on shaft 34 meshes with the gear 33 on the shaft of the roll 16. As illustrated in Fig. 1, the shaft 34 extends somewhat beyond the bearing 35 and forms one means adapted to be connected to a source of power, such as an internal combustion engine, for driving the rolls 15 and 16. However, since the device, when in operation, is normally pulled by a tractor, I have provided a spiral gear 38 on shaft 34 midway between the bearings 35 and 36 which meshes with a spiral gear 39 secured to the forwardly extending shaft 40 which is mounted in a yoke bearing 41 pivotally mounted on the shaft 34. The shaft 40 forms a second means adapted to be connected to a source of power, such as the power take-off of the tractor used in pulling the baler.

In order to feed loose hay to the compression rolls I provide, at the front of the machine, a rotatable rake 42 which extends transversely of the machine and is provided with radially-extending tines 43 adapted to run substantially in contact with the ground. To drive this rake, the shaft of the roller 15 extends through its bearing on the right hand side of the machine, looking forwardly, and has mounted thereon a gear 44 which meshes with a gear 45 on the inclined shaft 46. At the lower end of this shaft is a second gear 47 which meshes with a gear 48 on the shaft 64 of the rake 42.

As the machine is drawn forward, the rake 42, as viewed in Figs. 2 and 3, will be driven in a counter-clockwise direction and the tines thereof running between the hay-supporting elements 49, as best shown in Figs. 1 and 3, serve to sweep and convey the hay upwardly over these elements to the pinch of the rolls. In order to hold the hay down against the upper surfaces of the elements 49, I provide a plurality of elements 50 which ride on the top of the hay and are loosely mounted to swing up and down on the transversely-extending shaft 51 between the sides 5 of the drawbar.

From the foregoing it will be apparent that my device, as it is drawn over the ground, may feed the hay to the compression rolls from a pre-formed windrow in the same manner that the present types of balers feed the hay to their compressing mechanisms.

However, I prefer to equip my device with means for simultaneously forming its own windrow, as it is drawn over the field of loose mown hay, by providing at each side of the machine, and in advance of the rotating rake 42, an outwardly-extending, rotating rake 52, angularly disposed to the longitudinal axis of the machine, and having tines 53 adapted to run substantially in contact with the ground. The shafts on which the rakes 52 are mounted are carried, at their forward ends, in bearings 54 which are supported on casters 55 adapted to run on the surface of the ground. The bearings 54 and the casters are secured in adjustable, laterally-spaced relation to each other by means of the elements 56 which come together over the drawbar and are rather loosely secured together and to the drawbar 6 by means of a pin or threaded stud 57. A nut 58 may be threaded on the stud 57 to prevent the elements 56 from becoming disengaged therefrom. The elements 56 are provided with spaced holes 59 so that the distance between forward ends of the rakes 52 may be varied. This is a decided advantage because it permits the feed to the compression rolls to be regulated according to the weight of the hay per unit of area of the zone from which it is raked.

In order to rotate the rakes 52, the drive shaft 46, for the shaft 64 of the transversely-extending rake 42, extends somewhat beyond the gear 47 and is bifurcated and connected to the bifurcated end of the shaft of the rake 52 on the right hand side of the machine by means of crossed pins 60 (see Fig. 2) to form a universal joint. The rake 52 on the left side of the machine is driven from a shaft 61, somewhat similar to the shaft 46 but which, instead of being driven from the shaft of the roll 15, is driven through a spiral gear 62 thereon which in turn is driven by spiral gear 63 on the shaft 64 of the rake 42.

In operation, and assuming the device to be pulled over the ground by means of a tractor attached to the drawbar 6 and having its power take-off connected to the shaft 40, the splay of the rakes 52 is fixed, depending upon the weight of the hay, so that the rate at which the hay is fed to the compressing rolls is properly adjusted. As the loose mown hay is swept in front of the rake 42 by means of the side rakes 52, it is picked up by the tines 43 on rake 42 and conveyed upwardly over the hay supports 49 into the pinch 17 of the rolls 15 and 16 which press and shape it into a comparatively thin but compact ribbon-like web which is of uniform width and uniform density throughout. This is a result which is not attained by attempting to follow a preformed windrow because such windrows are seldom if ever straight and it is impossible to follow a crooked windrow closely enough to insure that the feeding mechanism on the baler will always be centered on the windrow. It is the universal practice in operating a hay baler always to leave a bale, or at least some compressed hay, in the compression chamber, and, assuming that there is already compressed hay in the compression chamber, the web of hay passing between the rolls 15 and 16 into the compression chamber contacts the hay already therein and then flexes, either upwardly or downwardly, until it hits either the bottom of the angle 21 or the top of the angle 22 and also the top and bottom flanges of the channels 11 and 12 and the webs of the channels 18 and 19. When the entering web of hay, which is flexed either upwardly or downwardly as the case may be, has moved upwardly or downwardly within the compression chamber as far as possible, it then flexes in the opposite direction so that, within the compression chamber, the hay is progressively folded, as shown more or less diagrammatically at 65 in Fig. 4. The incoming hay further compresses the hay already in the compression chamber, and, when the compressive force thereon exceeds the friction of the hay against the sides, top and bottom of the compression chamber, which may be adjusted by means of the nuts 27 and 28, the compressed hay will be gradually forced out of the open end 23 of the compression chamber.

In the event that there is no bale or compressed hay in the compression chamber, which would normally be the case only when a new machine is first put in operation, the passage of the hay through the compression chamber is ordinarily blocked by a board placed quite close to the rolls and held in place by hand with the help of a "two by four" or other means until a partially compressed body of hay is built up. In any event, it is well known that, in practically all balers, the first bale to come out of the machine is fairly loose as compared with the subsequent bales.

In order to cut the compressed hay into bale lengths, I provide the hydraulically actuated knife 66. Attached to each side of the compression chamber is a hydraulic cylinder 67 which is understood to have a piston therein connected to a piston rod 68. The piston rods 68 are connected together at the top by a cross member 69 which carries the knife 66. Pipes 70 and 71 communicating with the tops and bottoms, respectively, of the hydraulic cylinders 67 may be connected through a suitable control valve (not shown) to the hydraulic mechanism of the tractor for raising and lowering the knife.

At the present time, there are many devices commercially available for wrapping cords around bale lengths of hay in the compression chamber, and also knotting devices for tying the ends thereof to hold the hay in baled form. Since my invention is concerned substantially entirely with the means for compressing hay and for simultaneously windrowing and feeding it to the compressing means, I have not shown any means for tying the bales with cords because any of the well known devices may be used. However, needles which carry cords through the hay may be conveniently attached to the knife, as best shown at 72 in Fig. 5. These needles are secured to the knife in laterally spaced relation such that the cords carried thereby pass downwardly, with the knife, through the hay in the compression chamber in spaced relation to the side channels 11 and 12 as well as to the top and bottom channels 18 and 19. The cords from suitable balls (not shown) may be threaded through the holes 73 in the cross member 69 which ties the piston rods 68 together at the top of the knife downwardly between the side flanges 74 on the needles and through the eyes 75 near the points of the needles. This is the usual method of carrying the cords through the hay in the compression chamber of a baler, as is well understood in the art. When the needle points emerge from the bottom of the hay, the ends of the cords are gripped and held by any of the well known knotting mechanisms so that, when the needles are retracted, the cords draw through the eyes of the needles and portions thereof are left between the cut bales. As the hay is pushed through the compression chamber with the needles in retracted position, the cords continue to be drawn through the eyes of the needles and extend over the end of the bales and along the top and bottom thereof, as the hay is forced through the compression chamber, until the next cut is made which again carries the cords downwardly through the hay where they may be cut and knotted, by any of the devices now used on bales for this purpose, or, may even be cut and knotted by hand.

From the foregoing, it will be apparent that I have provided an extremely simple and efficient mechanism, not only for compressing substantially any loose materials into a compact mass, and which may be applied to a hay baler, either with or without the novel means for raking the hay into windrows simultaneously with the compressing and baling thereof.

By using comparatively large, coarse teeth for positively driving both the compressing rolls, these rolls may not only separate to an appreciable degree without the gears getting out of mesh, but such gearing imparts a slight, intermittent motion to the rolls. Thus, at times the upper roll, for example, will run slightly faster than the lower roll and at other times, slightly slower so that there is a tendency of the rolls to bend and break coarse stalks in the hay. Since the hay is not subjected to any rough treatment prior to the time when it passes through the pinch of the rolls, there is substantially no loss of hay due to the stripping of leaves and heads from the stems. Those that are stripped by the compressing rolls are carried into the compression chamber and incorporated with the compressed hay.

The degree to which hay can be compressed by a simple device such as I have described above, and which may be said to consist, essentially, merely of a pair of rolls, means forming a compression chamber, and some means for driving the rolls, is quite astonishing; and, although the hay may be under extremely high compression in the baled form, when the binding cords are cut, the hay is readily expanded or unfolded into loose form because of the peculiar way in which it is folded in the compressing operation.

While I have described my invention in its preferred embodiment, it is to be understood that the words which I have used are words of description rather than of limitation and that changes, within the purview of the appended claims, may be made without departing from the true scope and spirit of my invention in its broader aspects.

What I claim is:

1. A hay pressing machine of the ambulatory type comprising the combination with mechanism, including an elongated tubular element and a pair of compressing rolls disposed in substantially fixed relation to said element, for compressing a mass of loose hay into an elongated column in said element; of a knife for cutting said column into bale length; a mounting for said knife adapting it to reciprocate transversely through said element; hydraulically actuated means for reciprocating said knife; means adapted operatively to connect the last mentioned means to the hydraulic mechanism of a tractor; means carried by said machine for conveying loose mown hay from a zone directly in front of said conveying means to said compressing rolls, ground wheels on which said machine is carried, a pair of rotatable rakes disposed in front of said machine and carried thereby, one at each side of said conveying means and converging towards said conveying means, for raking loose mown hay from zones at each side of said machine into a zone directly in front of said conveying means; means adapted to be connected to a source of power for driving said compressing rolls, said conveying means and said rakes; and means for varying the degree of convergence of said rakes; whereby the width of the zone from which the loose mown hay is raked may be varied depending upon the weight of the hay per unit area of said zone.

2. A hay baler of the ambulatory type comprising an elongated tubular element within which the hay is compressed; a pair of cooperating rolls forming a closure for one end of said element and through the pinch of which said hay is compressed into a flat web and forced directly into and compressed into a columnar mass within said element; said rolls and said element being in substantially fixed relative relation; a rotatable rake extending transversely across the front of said baler and having tines adapted to run substantially in contact with the ground for conveying hay from a window directly to the pinch of said rolls; stationary hay supporting elements disposed between said tines along which the hay is pushed by said tines directly into the pinch of said rolls; means for holding the hay down upon said supporting elements to form a ribbon-like mass; mechanism cooperating with said rolls and said rake, including a driving shaft extending longitudinally of said baler adapted to be connected to the power take-off of a tractor, for driving the same; a reciprocating knife for cutting said mass into bale lengths mounted on said tubular element; hydraulically actuated means for forcing said knife transversely through said columnar mass; and means adapted operatively to connect said last mentioned means to the hydraulic mechanism of a tractor.

3. A hay pressing machine of the ambulatory type comprising the combination with mechanism, including an elongated tubular element and a pair of compressing rolls disposed in substantially fixed relation to said element, for compressing a mass of loose hay into an elongated column in said element; of a knife for cutting said column into bale length; a mounting for said knife adapting it to reciprocate transversely through said element; hydraulically actuated means for reciprocating said knife; means adapted operatively to connect said last mentioned means to the hydraulic mechanism of a tractor; ground wheels on which said machine is carried; a pick-up rake on said machine for conveying loose hay from a zone directly in front of said rake to said compressing rolls; a pair of rotatable rakes carried by said machine, one at each side of the front thereof and extending laterally outwardly therefrom, for raking loose mown hay from zones at each side of said machine into a zone directly in front of said pick-up rake; means for adjustably securing the advance ends of said side rakes in substantially fixed, laterally spaced relation; whereby the width of the zones from which the loose mown hay is carried by said side rakes to said pick-up rake may be varied according to the weight of the hay per unit area of said side zones; and mechanism, including a driving shaft extending longitudinally of said machine adapted to be connected to the power take-off of a tractor, for driving said rolls, said pick-up rake and said side rakes.

References Cited in the file of this patent

UNITED STATES PATENTS

| | | |
|---|---|---|
| 639,436 | Roberts | Dec. 19, 1899 |
| 942,443 | Gallaread | Dec. 7, 1909 |
| 947,039 | Hart | Jan. 18, 1910 |
| 1,877,770 | Larson | Sept. 20, 1932 |
| 2,114,580 | Thompson | Apr. 19, 1938 |
| 2,157,261 | Innes | May 9, 1939 |
| 2,380,190 | Rutter | July 10, 1945 |
| 2,381,620 | Russell | Aug. 7, 1945 |
| 2,400,555 | Johnston | May 21, 1946 |
| 2,417,309 | Lisle et al. | Mar. 11, 1947 |
| 2,469,580 | Scranton | May 10, 1949 |
| 2,481,995 | Godley | Sept. 13, 1949 |

FOREIGN PATENTS

| | | |
|---|---|---|
| 398,987 | France | Apr. 8, 1909 |
| 219,001 | Germany | Feb. 15, 1910 |
| 20,637 | Norway | Oct. 24, 1910 |
| 116,580 | Austria | Feb. 25, 1930 |
| 315,956 | Italy | Mar. 13, 1934 |